United States Patent [19]

Anderson

[11] Patent Number: 4,858,318
[45] Date of Patent: Aug. 22, 1989

[54] CONVERSION CHAIN SAW

[75] Inventor: Harvey G. Anderson, Muskegon, Mich.

[73] Assignee: Pro Power Corporation, Kalamazoo, Mich.

[21] Appl. No.: 255,780

[22] Filed: Oct. 11, 1988

[51] Int. Cl.⁴ .............................................. B27B 17/00
[52] U.S. Cl. ......................................... 30/122; 30/383
[58] Field of Search .......................... 30/122, 381–387, 30/500

[56] References Cited

U.S. PATENT DOCUMENTS

| 2,860,671 | 11/1958 | Wilder ................................... 30/122 |
| 4,033,035 | 7/1977 | Trimmer ................................. 30/122 |
| 4,272,889 | 6/1981 | Scott et al. ......................... 30/122 X |
| 4,649,644 | 3/1987 | Huddleston ............................ 30/122 |

Primary Examiner—Douglas D. Watts
Attorney, Agent, or Firm—Gordon W. Hueschen

[57] ABSTRACT

There is disclosed a conversion chain saw in which a circular power hand saw which has been converted into a saddle-type chain saw is modified so that it is adapted to use a pin-and-groove-type chain saw and to be again converted back to a saddle-type chain saw. There is mounted on the drive shaft, a dual sprocket composed of a saddle-type chain-saw sprocket, which may be the one in the original conversion, and a pin-and-groove-type chain-saw sprocket. The two sockets are mounted on the shaft in juxtaposition. A shim-plate provides a secondary mounting base for the support bar for the pin-and-groove type. It has an oil tube and conduit for conducting oil into a complementary oil conduit in the new support bar. A suitable coupling nipple is provided to provide for continuity in the oil circuit which takes advantage of the oil circuit already provided in the original conversion.

8 Claims, 1 Drawing Sheet

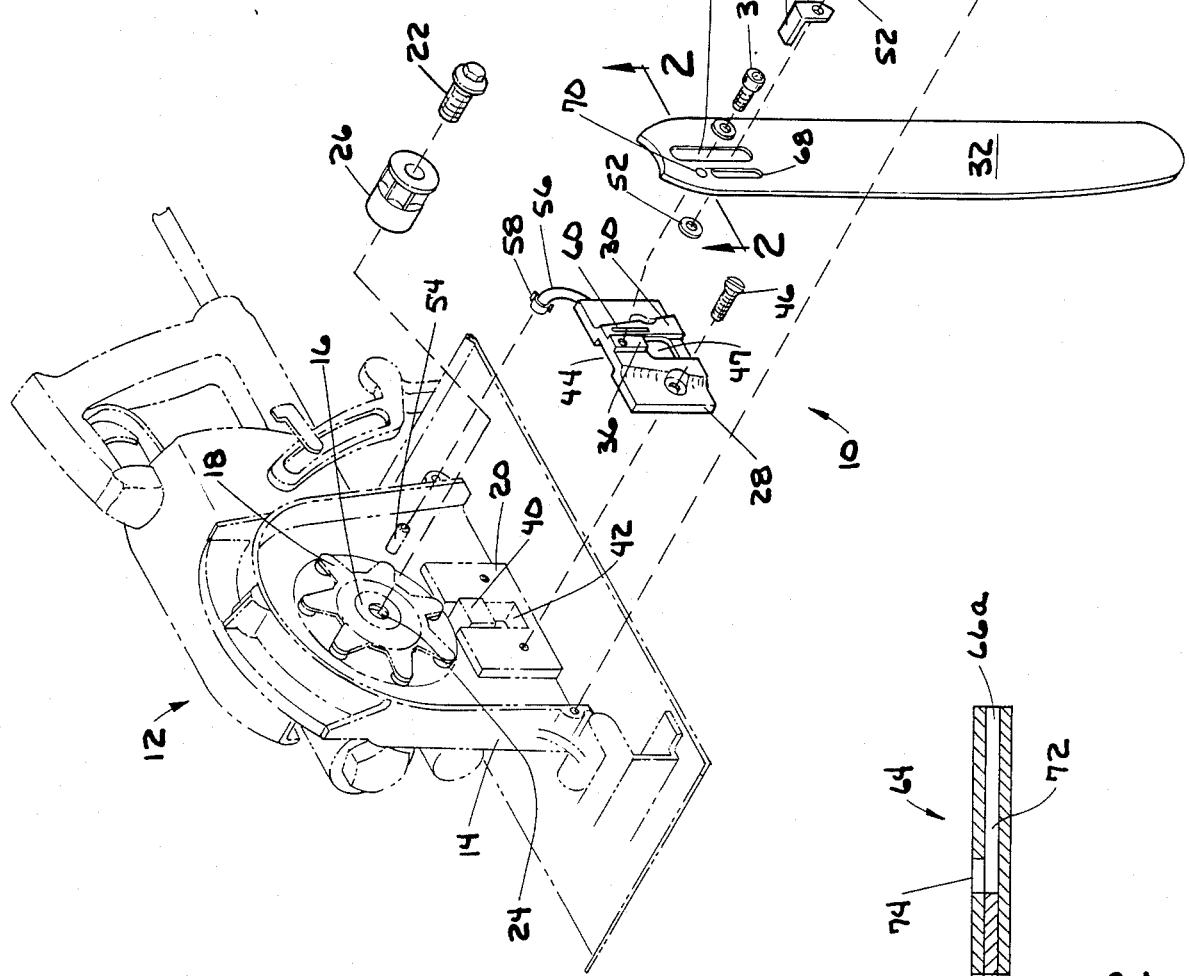
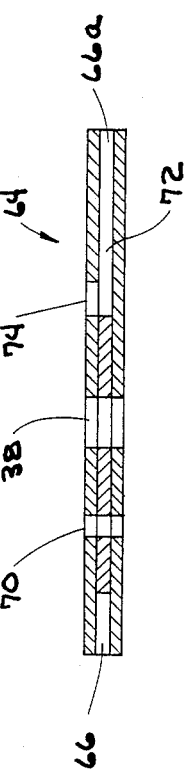
Fig. 1
Fig. 2

CONVERSION CHAIN SAW

FIELD OF THE INVENTION

THE PRIOR ART

This invention relates to a conversion chain saw and to a conversion kit for converting a circular power hand saw into a conversion chain saw, or a converted power hand saw into a conversion chain saw. The invention also relates to a conversion kit.

Various conversion chain saws obtained by converting a circular power hand saw are known in the art. For example, in U.S. Pat. No. 2,839,097, a chain-saw support-bar mounting block is affixed to the power unit of a circular power hand saw and a chain-saw drive sprocket is mounted on the power drive shaft instead of the circular saw to drive a chain-saw chain around the support bar. The support bar is clamped onto the mounting block by a tension-adjusting clamp block. The chain-saw attachment of this patent is to that kind of chain saw, which will be referred to as a pin-and-groove type because the chain is guided around the support bar by a pin or tongue riding in a peripheral groove in the support bar.

Similar conversion chain saws are disclosed in U.S. Pat. Nos. 4,270,270, 4,272,889, and 4,033,035.

Another type, to be referred to herein as a saddle-type chain saw, is disclosed in U.S. Pat. No. 4,309,931. In this type, the chain links have bearing faces which ride on the peripheral edge of the support bar and side members or flanges which center the chain on the support bar. A special sprocket, referred to herein as a saddle-type chain sprocket, is used. This kind of sprocket and a saddle-type chain conceivably can be substituted in U.S. Pat. No. 2,839,097, but efforts to make such substitutions have not been satisfactory because of the different widths and diameters of the two types of sprockets.

OBJECTS OF THE INVENTION

It is an object of the invention to overcome the disadvantages of the prior art and to make it feasible to convert from one type of chain-saw chain to another type, for example, from a saddle-type to a pin-and-groove type. It is a still further object to make it possible to effect one type to an other one and back again. It is a particular object of the invention to provide device such that conversion from one type to the other and back again, if desired, can be effected by means of a screw driver so that special tools are not required. It is yet a further to provide a new, useful, and unobvious chain saw. These and further objects will be come apparent as the description proceeds.

SUMMARY OF THE INVENTION

This invention relates to a conversion chain saw comprising:
  a power supply unit having a driven shaft;
  a housing member mounted on said power supply unit with said driven shaft projecting axially therefrom;
  chain-saw drive-sprocket means mounted on said shaft for rotation therewith;
  said drive-sprocket means comprising juxtaposed concentric sprocket means keyed to said shaft and adapted to drive different kinds of chain saws;
  chain-saw support-bar mounting means whereon a chain-saw support bar for a particular type of chain saw can be mounted in alinement with a complementary said concentric sprocket means;
  tension-adjusting means adapted to adjust the effective length of whatever support bar is mounted on said mounting means; and,
  oil-delivery means adapted to discharge oil to the support bar which is mounted on said mounting means.

The invention further relates to one or more further features
  in which said mounting base comprises a boss on the inner surface of said housing which has a base mounting face for mounting a chain-saw support bar thereon in functional alinement with the first concentric sprocket means;
  in which a shim-plate is affixed to said base mounting face thereby providing a secondary base mounting face for mounting a different chain-saw support bar thereon in functional alinement with the second concentric sprocket means;
  in which said concentric sprocket means comprises one adapted to drive a saddle-type chain-saw chain and one adapted to drive a pin-and-groove-type chain-saw chain;
  in which the different chain-saw support bar is one adapted to drive a pin-and groove-type chain-saw chain; and
  in which the shim-plate comprises an oil channel in the mounting face thereof adapted to communicate with an external source and with a complementary oil channel in said pin-and-groove chain-saw support bar whereby, when said last-name support bar is mounted on said shim-plate, oil can be fed thereto.

More particularly the invention relates to a conversion chain saw comprising:
  a power supply unit having a driven shaft;
  a housing member mounted on said power supply unit with said driven shaft projecting axially therefrom;
  dual sprocket means mounted on said shaft for rotation therewith;
  said dual sprocket means comprising a saddle-type chain-saw sprocket adapted to drive a saddle-type chain-saw chain and a pin-and-groove-type chain-saw sprocket adapted to drive a pin-and-groove-type chain-saw chain;
  a saddle-type chain-saw support-bar mounting base on the inner surface of said housing member;
  said mounting base having mounting means thereon whereby a saddle-type chain-saw support bar can be mounted thereon in alinement with said saddle-type chain-saw sprocket and be spaced from said housing member;
  said mounting base having a longitudinally-adjustable protuberance against which the support bar abuts when it is mounted on said mounting base, which protuberance determines the effective chain-receiving length of the support bar making it possible for the tension on a chain, when it is on a support bar mounted on said mounting base, to be adjusted by moving said adjustable protuberance;
  a pin-and-groove-type chain-saw mounting base comprising a shim-plate complementary to said saddle-type chain-saw support-bar mounting base and provided with means for removably affixing it to the same;

said shim-plate having a longitudinal undercut channel complementary with said protuberance and its longitudinal movability whereby, when the shim-plate is affixed, said adjustable protuberance can still be moved longitudinally back and forth, and said shim-plate having a longitudinal slot in registry with said channel;

affixing means for affixing a pin-and-groove-type chain-saw support bar on said pin-and-groove-type support-bar mounting base in alinement with said pin-and-groove-type chain-saw sprocket; and, a complementary protuberance adapted to be affixed to said pin-and-groove-type chain-saw support bar in a position such that, when the said bar is affixed to said shim-plate, said complementary protuberance will enter through said slot into said channel into a position to interrupt the thrust of said adjustable protuberance, whereby the tension on a chain on a pin-and-groove-type chain-saw support bar mounted on said shim-plate can be adjusted by adjusting said adjustable protuberance.

The invention further relates to a conversion kit for converting a chain saw which has been converted from a circular power hand saw into a hand chain saw capable of driving a saddle-type chain-saw chain, comprising a power unit, a replacement housing member functioning as a guard for said saddle-type chain-saw chain and a mounting base for mounting a saddle-type chain-saw support bar, a driven shaft projecting from said power unit axially through said housing member, a saddle-type chain-saw sprocket mounted thereon, and said mounting base having a longitudinally-adjustable protuberance against which the support bar abuts when it is mounted on said mounting base, which protuberance determines the effective chain-receiving length of the support bar making it possible for the tension on the chain, when it is on the support bar and the support bar is on the mounting base, to be adjusted by moving said adjustable protuberance;

which conversion kit comprises:

a pin-and-groove-type chain-saw sprocket adapted to drive a pin-and-groove-type chain-saw chain and adapted to be affixed axially on said driven shaft concentric with and axially juxtaposed to the saddle-type sprocket which is already mounted thereon;

a shim-plate complementary to said saddle-type chain-saw mounting base adapted to be removably affixed to the same to form therewith a pin-and-groove-type chain-saw support-bar mounting base;

said shim-plate having a longitudinal undercut channel complementary with said adjustable protuberance and its longitudinal movability, whereby, when the shim-plate is affixed, said adjustable protuberance can still be moved longitudinally back and forth, and said shim-plate having a longitudinal slot in registry with said channel;

affixing means for affixing a pin-and-groove-type chain-saw support bar on said pin-and-groove-type mounting base in alinement with said pin-and-groove-type chain-saw sprocket; and, a complementary protuberance adapted to be affixed to said pin-and-groove-type chain-saw support bar in a position such that, when such a support bar is affixed to said shim-plate, the complementary protuberance will enter through said slot into said channel into a position to intercept the thrust of said adjustable protuberance, whereby the tension on a chain on a pin-and-groove-type chain-saw support bar, mounted on said pin-and-groove-type chain-saw support-bar mounting base, can be adjusted by adjusting said adjustable protuberance.

BRIEF DESCRIPTION OF THE DRAWINGS

FIG. 1 is an exploded view of a conversion chain saw according to the invention, and FIG. 2 is a detail view in enlarged section taken on line 1—1 of FIG. 1.

DESCRIPTION OF PREFERRED EMBODIMENTS

In FIG. 1 there is shown at 10 a conversion chain saw of the invention. At 12 is a power unit of an ordinary circular power hand saw having mounted thereon a conversion housing member 14. The power unit 12 has a drive shaft 16 which projects axially through the housing member 14.

A saddle-type chain-saw sprocket 18 is keyed to, or otherwise affixed to, drive shaft 16 and is held against axial displacement by bolt 22 which is threaded into bore 24 in shaft 16. In functional alinement with sprocket 18 is a mounting base 20 for mounting a saddle-type chain-saw support bar (not shown). Such a support bar, if desired, can be like the one shown in U.S. Pat. No. 4,309,931, and is taken off in making the conversion of the invention.

To effect this conversion, a pin-and-groove-type sprocket 26 is bolted on the end of shaft 16 by bolt 22 and any conventional means can be used, as desired, to key this sprocket to sprocket 18 and/or shaft 16. A shim-plate 28 is bolted or otherwise affixed to the mounting base 20 and has a mounting surface 30 upon which to mount a pin-and-groove-type support bar 32 by bolt 34. An elongate boss 36 is provided on the shim-plate 28 and a complementary slot 38 in support 32 to fix the orientation of the support bar 32. If desired, additional like means can be used to insure a rigid fixation of the support bar 32 on the shim-plate 28.

The mounting base 20 is provided with a longitudinally-adjustable (vertically-movable) protuberance 40 adapted to be moved by a screw (not shown) up and down (longitudinally relative to the support bar 32) in slot or channel 42. When a saddle-type support bar is mounted on the mounting base 20, a portion of the support bar abuts the adjustable protuberance 40 so that its effective length can be varied by moving the adjustable protuberance 40. This allows for adjusting the tension on the chain used and/or for accommodating chains of slightly different lengths.

The shim-plate 28 has an undercut channel 44 complementary to the adjustable protuberance 40 which functions, when the shim-plate 28 is mounted on mounting base 20, as by suitable fastening means such as screws 46 (two are ordinarily used but the second one is not shown), to permit the adjustable protuberance to be moved in channel 44 in its normal traverse. A portion of the shim-plate is cut away below the boss 36 to form a slot or window 47 so that the adjustable protuberance 40 is accessible to the support bar 32. A complementary protuberance 48 has a longitudinal leg 48a which is bolted in elongate slot 38 by a suitable bolt 50 and washers 52 which are large enough to span the slot 38. It is positioned in the slot 38 so that when the support bar 32 is mounted on the shim-plate 28, the complementary protuberance 48 will enter slot 46 and be in position to engage the thrust of adjustable pro-tuberance 40. Thus when the position of the adjustable protuberance 40 is adjusted, the effective length of support bar 32 is adjusted correspondingly.

An oil-delivery tube 54 is positioned to deliver oil to a saddle-type chain in the original conversion unit. It communicates with a pump and oil reservoir (not shown) of any con-ventional design. It is adapted also to communicate by means of a connecting nipple 58 with oil tube 56 which delivers oil to the shim-plate 28. The shim-plate 28 has a channel 60 cut in the mounting face 30 adapted to register with an oil conduit 64 in the support bar 32 which conduit communicates with tube 56. The oil con-duit 64 is formed by taking advantage of the laminated construction of the support bar 32. Three sheets of steel are spotwelded to form a bar with a peripheral groove 66. Portions of all three sheets are cut away to form slots 38 and 68 and bore 70. The latter two are artifacts of the process of manufacture. A portion of the middle sheet is cut away at 72 from a bore 74 in the shim-plate-side only to the peripheral slot at 66a thus forming the oil conduit 64. When the support bar 32 is clamped on the shim-plate 28 with the bore 74 in registry with the channel 60, oil can flow through the tube 54-56-58 into conduit 72 onto the chain riding in the peripheral groove 66.

A cover plate 76 for the housing member 14 can be provided. It can be provided with bent-in legs 78 to cover the portions of the housing member not needed when the narrower support bar 32 is used. Also it may be contoured with an outwardly projecting embossed portion 80 to provide a snug clearance around the saw blade and secured to housing 14 by screw 82.

It will be observed that once the pin-and-groove sprocket 26 is affixed to the the drive shaft 16 by the bolt 22, a permanently-attached dual sprocket 24-26 is formed. Thereafter, there will be no need for a wrench or other special tool because conversion from a saddle-type chain saw to a pin-and-grove type and back again, if desired, can be effected simply by the use of a screwdriver.

While the invention has been described with reference to particular embodiments thereof, it is to be understood that it is not to be limited in the details of these embodiments as variations will readily be apparent to those skilled in the art once they have been apprised of the invention and that the invention, accordingly, is not to be limited except by the scope of the appended claims.

I claim:

1. A conversion chain saw comprising:
    a power supply unit having a driven shaft;
    a housing member mounted on said power supply unit with said driven shaft projecting axially therefrom;
    chain-saw drive-sprocket means mounted on said shaft for rotation therewith;
    said drive-sprocket means comprising juxtaposed concentric sprocket means keyed to said shaft and adapted to drive different kinds of chain saws;
    a chain-saw support-bar mounting base whereon a chain-saw support bar for a particular type of chain saw can be mounted in alinement with a complementary said concentric sprocket means;
    tension-adjusting means adapted to adjust the effective length of whatever support bar is mounted on said mounting base; and,
    oil-delivery means adapted to discharge oil to the support bar which is mounted on said mounting base.

2. A conversion chain saw according to claim 1, in which said mounting base comprises a boss on the inner surface of said housing which has a mounting face for mounting a chain-saw support bar thereon in functional alinement with the first concentric sprocket means.

3. A conversion chain saw according to claim 2, in which a shim-plate is affixed to said base mounting face thereby providing a secondary base mounting face for mounting a different chain-saw support-bar thereon in functional alinement the second concentric sprocket means.

4. A conversion chain saw according to claim 1, in which said concentric sprocket means comprise one adapted to drive a saddle-type chain saw chain and one adapted to drive a pin-and-groove-type chain saw chain.

5. A conversion chain saw according to claim 3, in which said different chain-saw support bar is one adapted to drive a pin-and-groove-type chain saw chain.

6. A conversion chain saw according to claim 5, in which said shim-plate-plate comprises an oil channel in the mounting face thereof adapted to communicate with an external source and with a complementary oil channel in said pin-and-groove chain-saw support bar whereby, when said last-name support bar is mounted on said shim-plate-plate, oil can be fed thereto.

7. A conversion chain saw comprising:
    a power supply unit having a driven shaft;
    a housing member mounted on said power supply unit with said driven shaft projecting axially therefrom;
    dual sprocket means mounted on said shaft for rotation therewith;
    said dual sprocket means comprising a saddle-type chain-saw sprocket adapted to drive a saddle-type chain-saw chain and a pin-and-groove-type chain-saw sprocket adapted to drive a pin-and-groove type chain-saw chain;
    a saddle-type chain-saw support-bar mounting base on the inner surface of said housing member;
    said mounting base having mounting means thereon, whereby a saddle-type chain-saw support-bar can be mounted thereon in alinement with said saddle-type chain-saw sprocket and be spaced from said housing member;
    said mounting base having a longitudinally-adjustable protuberance against which the support bar abuts when it is mounted on said mounting base, which protuberance determines the effective chain-receiving length of the support bar making it possible for the tension on a chain, when it is on a support bar mounted on said mounting base, to be adjusted by moving said adjustable protuberance;
    a pin-and-groove-type chain-saw mounting base comprising a shim-plate complementary to said saddle-type chain-saw support-bar mounting base and provided with means for removably affixing it to the same;
    said shim-plate having a longitudinal undercut channel which is complementary with said adjustable protuberance and functions, when the shim-plate is affixed, to permit said protuberance to be moved longitudinally back and forth in its normal traverse, and said shim-plate having a longitudinal slot in registry with said channel;

affixing means for affixing a pin-and-groove-type chain-saw support bar on said pin-and-groove-type support-bar mounting base in alinement with said pin-and-groove-type chain-saw sprocket; and, a complementary protuberance adapted to be affixed to said pin-and-groove-type chain-saw support bar in a position such that, when the said bar is affixed to said shim-plate, said complementary protuberance will enter through said slot into said channel into a position to intercept the thrust of said adjustable protuberance, whereby the tension on a chain on a pin-and-groove-type chain-saw support bar, mounted on said shim-plate, can be adjusted by adjusting said adjustable protuberance.

8. A conversion kit for converting a chain saw which has been converted from a circular power hand saw into a hand chain saw capable of driving a saddle-type chain-saw chain, comprising a power unit, a replacement housing member functioning as a guard for said saddle-type chain-saw chain and a mounting base for mounting a saddle-type chain-saw support bar, a driven shaft projecting from said power unit axially through said housing member, a saddle-type chain-saw sprocket mounted thereon, and said mounting base having a longitudinally-adjustable protuberance against which the support bar abuts when it is mounted on said mounting base, which adjustable protuberance determines the effective chain-receiving length of the support bar making it possible for the tension on the chain, when it is on the support bar and the support bar is on the mounting base, to be adjusted by moving said adjustable protuberance; which conversion kit comprises:

a pin-and-groove-type chain-saw sprocket adapted to drive a pin-and-groove type chain-saw chain and adapted to be affixed axially on said driven shaft concentric with and axially juxtaposed to said saddle-type sprocket which is already mounted thereon;

a shim-plate complementary to said saddle-type chain-saw mounting base adapted to be removably affixed to the same to form therewith a pin-and-groove-type chain-saw support-bar mounting base;

said shim-plate having a longitudinal undercut channel complementary with said adjustable protuberance and its longitudinal movability, whereby, when the shim-plate is affixed to said mounting base, said adjustable protuberance can still be moved longitudinally back and forth, and said shim.-plate having a longitudinal slot in registry with said channel;

affixing means for affixing a pin-and-groove-type chain-saw support bar on said pin-and-groove type support-bar mounting base in alinement with said pin-and-groove-type chain-saw sprocket; and, a complementary protuberance adapted to be affixed to said pin-and-groove-type chain-saw support bar in a position such that, when such a support bar is affixed to said shim-plate, the complementary protuberance will enter through said slot into said channel into a position to intercept the thrust of said adjustable protuberance, whereby the tension on a chain on a pin-and-groove-type chain-saw support bar, mounted on said shim-plate, can be adjusted by adjusting said adjustable protuberance.

* * * * *